May 28, 1968 A. F. SCHMECKENBECHER 3,385,725

NICKEL-IRON-PHOSPHORUS ALLOY COATINGS FORMED BY ELECTROLESS DEPOSITION

Filed March 23, 1964 2 Sheets-Sheet 1

INVENTOR
ARNOLD F. SCHMECKENBECHER

BY

Bertram M. Mullin
ATTORNEY

May 28, 1968 A. F. SCHMECKENBECHER 3,385,725

NICKEL-IRON-PHOSPHORUS ALLOY COATINGS FORMED BY ELECTROLESS DEPOSITION

Filed March 23, 1964 2 Sheets-Sheet 2

United States Patent Office 3,385,725
Patented May 28, 1968

3,385,725

NICKEL-IRON-PHOSPHORUS ALLOY COATINGS FORMED BY ELECTROLESS DEPOSITION

Arnold F. Schmeckenbecher, Poughkeepsie, N.Y., assignor to International Business Machines Corporation, New York, N.Y., a corporation of New York Filed Mar. 23, 1964, Ser. No. 353,849
6 Claims. (Cl. 117—130)

ABSTRACT OF THE DISCLOSURE

Solutions and processes for the electroless plating of nickel-iron-phosphorus alloys in thin film magnetic devices, in which aqueous solutions of nickel and iron salts, sodium hypophosphite as a reducing agent and complexing agents are used to provide nickel and ferrous ions in ratios in the range of 1 to 5, and hypophosphite ions in concentrations equivalent to about 3.2 to 10 grams of sodium hypophosphite per liter at a pH of about 10 to 13 for plating films having 64.5% to 75.5% nickel content, 24% to 35% iron content and about 0.5% to 2% phosphorus content at a rate in the range of 150 to 1500 A. per minute.

*Summary of invention*

This invention relates to magnetic films, and, in particular, to magnetic film compositions and to the method of producing such films for application as storage and switching elements in data processing and computer machines.

Ever since M. J. Blois, Jr., described in The Journal of Applied Physics, volume 26, p. 975, 1955, the preparation of thin films of 80:20 (by weight), nickel-iron, in the presence of an orienting magnetic field to induce uniaxial anisotropy, considerable effort has been expended to develop a practical thin film storage device for computers. These films exhibit two stable states, along the preferred direction of magnetization, corresponding to positive and negative remanence. With the application of selected electrical signals along conducors, in contact with, or in the vicinity of, the film, the magnetization is switched from one of its remanent states to the other to represent intelligence. The state of magnetization, corresponding to this intelligence, is recognizable upon integration with the application of further selected electrical pulses and the intelligence retrieved.

Although, in general, it is recognized that the permalloy family, that is, compositions containing from 15 to 45 percent iron and 55 to 85 percent nickel, offer the most promising films for these applications and that conventional techniques such as vacuum deposition, electroplating, cathode sputtering, and pyrolytic methods are available, much remains to be accomplished, before a film from one of these techniques is adaptable for use in a data processing or computer machine. Problems are encountered in reproducibility and in the uniformity of characteristics obtained with the magnetic films from these techniques.

One method which has not received the attention that the other methods have, is that of chemical reduction or electroless plating. Nickel, nickel-cobalt and other metal alloy films have been deposited on an active or catalytic surface by the reduction of the metal salts with hypophosphite but few advances have been made in the production of nickel-iron films where the major constituent of the film is nickel. In those instances where nickel-iron films have been deposited electrolessly, the resulting films were disturb sensitive and exhibited a low one to zero difference signal. The former property, disturb sensitivity, is a measure of the ability of a film to remain in a selected remanent state in the presence of stray fields; the more disturb sensitive a film is, the more precisely must the switching fields conform to specified magnitudes and directions. The latter quantity, the one to zero difference signal, is a measure of the signal available for sensing intelligence on interrogation, the lower the signal is, the more difficult it becomes to accurately discriminate between noise signals and intelligence signals, and, the greater are the demands placed on the sensing circuits involved. Accordingly, magnetic films produced from such processes lack economy and reliability.

Now what has been discovered is that these aforementioned disadvantages with the chemical reduction of a nickel-iron film are overcome with an electroless solution in which the hypophosphite ion concentration is maintained below 7.00 grams/liter. While the reasons for this are not well understood, a working hypothesis has been formulated. In the electroless solution containing 7.00 grams/liter of the hypophosphite ions or less, the plating rate is slower than with a higher concentration of hypophosphite. This allows for more interaction and growth of secondary ingredients which may favor high resistivity, and, in turn, less eddy current formation, and, thereby provide more complete switching of the film.

Another factor, along with the hypophosphite ion concentration, which directly affects the plating operation, is the pH value. It is found that it is necessary that the solution have a high pH value, that is, a pH of at least 8. With solutions having a pH lower than this, very little iron is deposited in the film, however large the amount of ferrous ions in the solution. Optimum results are obtained when the pH is maintained at a value of 10 or higher. Within these limits of hypophosphite concentration and pH, magnetic films are obtained which heretofore were not available in the art.

Accordingly, it is a primary object of this invention to provide a magnetic film having an improved combination of properties.

It is a further object of this invention to provide an improved chemical reduction process for electrolessly depositing magnetic films suitable for computer applications.

It is yet another object of this invention to provide a process for producing magnetic storage and switching elements having enhanced magnetic properties.

It is still another object of this invention to provide an electroless solution for chemically depositing magnetic films with improved magnetic properties.

It is still a further object of this invention to provide an economical and feasible process for producing magnetic films with reproducibility and uniformity of characteristics.

These objects are accomplished with a new electroless plating solution that contains an alkaline aqueous solution of nickel ions, ferrous ions, up to 7.00 grams/liter hypophosphite ions and with pH maintained at at least 8. The process is based on the controlled autocatalytic reduction of the nickel and iron by the means of the hypophosphite anions. New nickel-iron-phosphorus alloys are chemically deposited from such an electroless solution, by placing into contact therewith, substrates which are composed of copper, nickel, cobalt, iron, steel, aluminum, zinc, palladium, platinum, brass, manganese, chromium, molybdenum, tungsten, titanium, tin, silver, carbon, or graphite, and alloys containing any of these. The catalytic nature of these materials causes the reduction of the nickel and iron to the nickel-iron-phosphorus, alloys by the hypophosphite anions present. Of course, it will be realized by those versed in the art that non-catalytic surfaces such as non-metallic materials may receive beneficial treatment, by such a process, where the surface of the non-catalytic material is first sensitized, by producing a film of one of the catalytic materials on its surface. This is accomplished by a variety of techniques known to those skilled in the art.

When performing electroless plating of nickel and iron in an alkaline solution, the presence of a compound forming water soluble nickel complexes is necessary in order to prevent precipitation of the nickel as a hydroxide or hypophosphite. This is avoided with the addition of sufficient ammonia or ammonia salts to form the nickel hexamine complex ion. To prevent the precipitation of the iron as ferrous ions, tartrate ions are added to keep the concentration of the ferrous ions below their solubility limit. Similarly, the activity of the hypophosphite ion is regulated by adjusting the free alkali content as measured by the hydroxyl ion content of the solution, this being done with the addition of sodium hydroxide, ammonium hydroxide, and other bases.

It will be recognized by those versed in the art that other complexing or sequestering agents besides the ammonia and tartrate ions are usable in the solution of this invention. These include organic complex forming agents containing one or more of the following functional groups: primary amino group ($-NH_2$), secondary amino group ($>NH$), tertiary amino group ($>N-$), imino group ($=NH$), carboxy group ($-COOH$), and hydroxyl group ($-OH$). The preferred agents are Rochelle salt, Seignette salt, tartaric acid, ammonia, ammonium hydroxide, and ammonium chloride. Related polyamines and N-carboxymethyl derivatives thereof may also be used. Cyanides may not be employed since the plating process will not function in their presence.

The nickel and ferrous ions may be employed in the form of any water soluble salt which is not antagonistic to the plating process. They may be furnished in the form of chlorides, sulfates, acetates, sulfanates, and mixtures thereof.

In carrying out the electroless plating process the article to be plated, that is the catalytic material, is properly prepared by mechanical cleaning and degreasing according to the standard practice of the industry. If the material to be plated consists of copper or a copper alloy, the article is then further cleaned by dipping in 10% hydrochloric acid for about 30 seconds at room temperature, then activated by dipping in a 0.1% palladium chloride solution for about 15 seconds and at room temperature. Due to an exchange reaction $$\text{Metal}^0+\text{Pd}^{++}=\text{Metal}^{++}+\text{Pd}^0$$

some palladium is deposited on the catalytic surface. It acts as a catalyst to initiate the reduction of nickel and iron by the hypophosphite.

The activated catalytic material is then brought into contact with the plating solution which has been heated to the desired temperature while it is covered with a layer of xylene. The plating solution is covered with the xylene to prevent, as much as possible, the oxidation of the ferrous ion to the ferric ion, an undesirable ingredient in the solution, if it is present in concentrations of more than about 200 mg./l. of $Fe^{+++}$. The catalytic surface is maintained in contact with the plating solution until a nickel-iron phosphorus alloy is formed on the surface of the desired composition. Where anisotropic properties are desired, the plating is performed in the presence of a field, while if isotropic characteristics are preferred, the plating is performed without the application of any external fields.

In this manner novel nickel-iron-phosphorus alloys are formed having unique characteristics for computer applications. The alloys contain from 15% to 35% by weight iron, 65% to about 85% by weight nickel, and about 0.25% to about 2% by weight phosphorus, and is being preferred to form an alloy containing from 28% to 30% by weight iron, 70% to 72% by weight nickel, and about 0.5% by weight phosphorus. These alloy films and thin layers appear silver metallic with small dark dots visible under the microscope. At higher thicknesses they turn from golden brown to dark brown. They have a face centered cubic structure and their surface is corrugated, and, electronic microscopes at 48,000× show an agglomeration of balls with their diameter in the order of 1000 A. These films in thicknesses of about 20,000 A. when exposed to driving fields switch their magnetization within relatively short times. Their switching speeds are in the order of 2 to 6 nanoseconds with an applied field of 20 oersteds. Their voltage signal is a sharp symmetrical peak, typical of rotational switching. Nickel-iron films produced by other prior art techniques only exhibit such behavior when in extremely thin layers or when driven by exceedingly high fields. These films produce large one to zero signals and exhibit a low disturb sensitivity.

The foregoing and other objects, features and advantages of the invention will be apparent from the following more particular description of the preferred embodiments of the invention as illustrated in the accompanying drawings.

*Detailed description*

Figure 1:
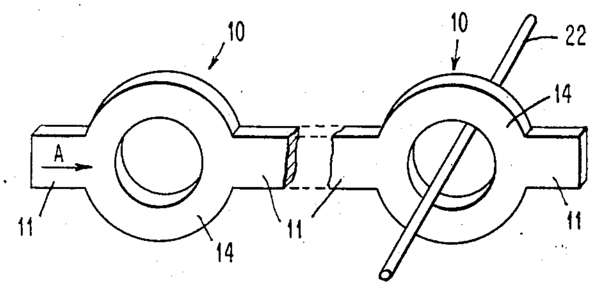
FIGURE 1 is an isometric diagram of the substrate utilized in the deposition of the magnetic film according to the invention.

Now, more particularly as to the formation of the magnetic film on a memory element by the novel solution and process of this invention, reference is made to FIGURE 1 which shows a conductive strip in the form of a chain-like configuration in which the magnetic film of this invention is deposited. FIGURE 1 shows several elements 10 of the chain-like configuration prior to undergoing the magnetic deposition. The conductive strip element 10 includes toroidal or elliptically shaped portions 14 which are electrically coupled by neck portions 11. The toroidal or elliptically shaped portions 14 form the storage unit. The conductive strip storage device is described more fully in U.S. patent application Serial No. 332,588 to Hans-Otto G. Leilich and in U.S. patent application Serial No. 332,746 to John L. Anderson et al., both of which are assigned to the assignee of the instant invention. Of course, it will be recognized that, although only two storage units are shown in the chain-like configuration, it will be understood that many such units may form part of one chain-like substrate.

In forming the substrate, that is, conductive strip 10, two ounce (.0028 inch in thickness) rolled copper foil is preferred, although, as heretofore mentioned, any catalytic surface is usable. The copper foil is cleaned in a 10% solution of hydrochloric acid, rinsed with water, and dried. Conventional photo-resist is applied, and the material is then exposed with positive art work, to zenon arc lamp or equivalent light source for a few seconds. The material is then etched in 30° Bé. ferric chloride, immersed in photographic fixer and the required chain-like structure developed according to standard techniques.

Following this, the chain-like structure is again rinsed in hydrochloric acid, washed with water, then it is dipped for about 15 seconds at room temperature into a solution of 1 gram of purified palladium chloride in a mixture of 1000 milliliters of water and 1 milliliter of concentrated hydrochloric acid for sensitizing. Following this, the chain-like structure is again rinsed with water.

Figure 2:
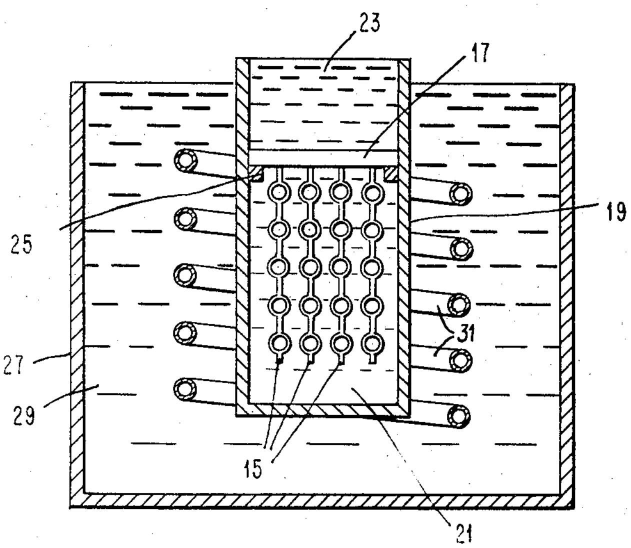
FIGURE 2 is a cross-sectional view of the apparatus used in the deposition of the magnetic film according to this invention.

The substrate is then ready for receiving the magnetic film. To do this, as illustrated in FIGURE 2, a series of conductive strips 15 are mounted along a rack 17 and inserted into container 19 which holds the required electroless solution 21, covered with a layer of xylene 23, which is used to prevent oxidation of the cations of the electroless solution, and heated to the desired plating temperature. The rack is mounted within the container on supports 25, positioned along the sides of the container. The container is inserted into a vat 27 which contains a liquid medium 29, such as water or oil, for maintaining a constant bath temperature. The container is surrounded by Helmhotz coil 31 where anisotropic characteristics are desired in the film, while, if isotropic characteristics are sought, the coil 31 is not used.

The electroless solution utilized contains the constituent materials in the concentrations as shown in the following chart which includes as complexing agents ammonium salt and a tartaric salt. It is to be noted that other complexing agents are usable as heretofore discussed and is further brought out in the discussion that follows. It is to be noted that the chart gives the concentration in grams/liter of aqueous solution of each ion constituent present in the solution. In each instance, the minimum, optimum and maximum concentration for each compound, salt and ion constituents are given in tabular form.

| Electroless Solution | Grams/Liter | | |
|---|---|---|---|
| | Min. | Preferred | Max. |
| Nickel ions, $Ni^{++}$ | 0.3 | 3.30 | 30 |
| Ferrous ions, $Fe^{++}$ | 0.1 | 1.1 | 10 |
| Hypophosphite ions, $(H_2PO_2)^-$ | 2.00 | 3.5 | 7.0 |
| Tartrate ions, $(C_4H_4O_6)^=$ | 5 | 17.5 | 80 |
| Nickel to ferrous ion ratio, $Ni^{++}/Fe^{++}$ | 1.00 | 3.0 | 5 |
| pH | 8 | 11.5 | 13 |
| Ammonium ions | 0.6 | 64 | 300 |
| Temperature, ° C | 50 | 75 | 95 |
| Time, minutes | 5 | 45 | 120 |
| Plating rate, A./min | 150 | 500 | 1,500 |

As is noted from the above chart, the preferred ratio of the nickel ions to ferrous ions in this plating solution should be approximately 3 to 1, the hypophosphite ions about 3.5 grams/liter, and the pH maintained at about 11.5 to develop the optimum characteristics available from the electroless solution.

The following are illustrative examples of the magnetic film composition, the electroless solution, the process of depositing the same, and the working conditions for the procedure which are given here by way of illustration and not as limitations.

EXAMPLE 1

Following the preparation of the copper substrate as described heretofore, the substrate is immersed in an electroless solution. The electroless solution was formed by mixing 25 milliliters of a solution containing 240 grams/liter of nickelous chloride $NiCl_2 \cdot 6H_2O$) and mixed with about 150 milliliters of water. 12.5 milliliters of a solution containing 200 grams/liter of sodium hypophosphite ($NaH_2PO_2 \cdot H_2O$) and 25 milliliters of a solution containing 600 grams/liter of sodium potassium tartrate ($KNaC_4H_4O_6 \cdot 4H_2O$) are then added. The mixture is filled to 250 milliliters. 100 milliliters of a solution containing 3.5 grams ferrous ammonium sulfate $(NH_4)_2SO_4$ $FeSO_4 \cdot 6H_2O$ and 100 milliliters of ammonium hydroxide solution containing 28 to 30 percent $NH_3$ are added.

This bath contains:

3.30 grams/liter $Ni^{++}$,
1.10 grams/liter $Fe^{++}$,
3.44 grams/liter $(H_2PO_2)$,
17.5 grams/liter $(C_4H_4O_6)$, and
223 milliliters/liter ammonium hydroxide solution (28% $NH_3$).

pH value was maintained at about 11.5 and the ratio of nickel ions to ferrous ions at about 3 to1. The solution was poured into the container, covered with about ½ inch thick layer of the xylene and heated by suitable means to maintain the bath about the container at about 75° C. The activated substrates hanging from the rack are positioned in the solution for about 40 minutes. Both anisotropic films were made in separate runs. In the case where the anisotropic films were made, a homogeneous linear magnetic field of 40 oersteds was applied along the longitudinal axis of the substrates. Following the deposition, the substrates were removed, rinsed with water and dried.

Figure 3:
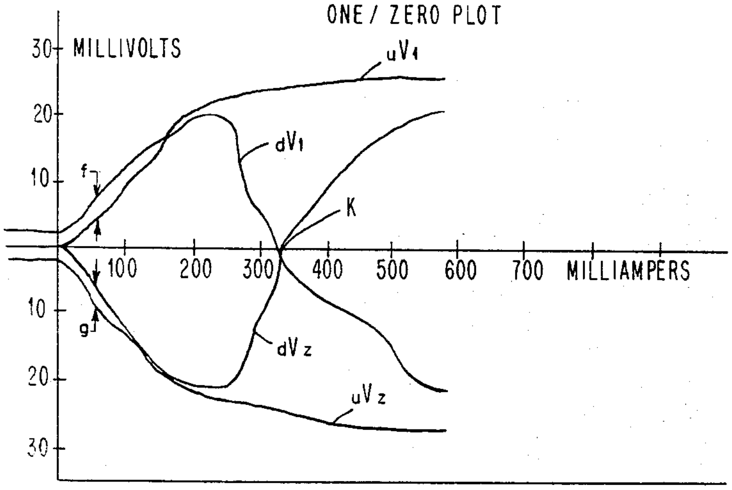
FIGURE 3 is a graphical representation in the form of S-curves to display the magnetic characteristics of the magnetic film according to the invention.

S-curves as depicted in FIGURE 3 were plotted for the magnetic films coated on the substrates. These curves indicate the type of magnetic characteristics which are available with the film when utilized as a memory storage element such as described in the copending U.S. patent applications of Hans-Otto G. Leilich and John L. Anderson et al. mentioned previously.

These curves are obtained with a constant word pulse while varying the bit pulse. As described in the heretofore mentioned copending U.S. patent applications, the memory element of FIGURE 1 is switched, that is, the magnetic remanence switched from one stable state to the other by the application of longitudinal and transverse pulses. The longitudinal pulse, the word pulse, is applied along the longitudinal axis of the element, that is, along the direction indicated by arrow A, while the transverse pulse, the bit pulse, is applied along conductor 22 (shown for one element) through the aperture of the element. To write in the element, a unipolar word pulse of about 640 milliamperes in amplitude and 20 nanoseconds rise time is passed along the longitudinal axis of the element. A bit current with a time lag of about 55 nanoseconds is passed through conductor 22 going through the aperture of the element. The bit current has an amplitude increasing from zero to 600 milliamperes and a rise time of 30 nanoseconds. Reading is accomplished on the leading edge of the word pulse while writing is performed when the word pulse and bit pulse overlap. By maintaining the word pulse constant and varying the bit pulse over the ranges indicated in FIGURE 3, the waveform for the undisturbed one signal ($uV_1$) is obtained. To obtain the waveform for the disturbed one signal $dV_1$, the same procedure as for the undisturbed one signal $uV_1$ is followed, but, after the bit pulse is applied, the stored information is disturbed by applying from 500 to 1000 bit pulses of the appropriate polarity and of amplitude to 20% higher than the previous bit pulse with a rise time of 20 nanoseconds. The undisturbed zero $uV_z$ is obtained, as the undisturbed one $uV_1$, but the polarity of the bit pulse is reversed to that of the polarity for the undisturbed one $uV_1$. Similarly, the disturb zero $dV_z$ obtained in a similar fashion to the disturbed one $dV_1$, with the polarities of the bit pulse being reversed as described for the undisturbed one $uV_1$.

These curves give an indication of the available one to zero difference signal for sensing intelligence in the operation of the memory element. What is desired, in such an S-curve, is that the disturbed one $dV_1$ and zero signal $dV_z$ be large over a wide range of bit currents and, in particular, it is desired that the signals be large at low bit currents, that is, the curves rise fast from the origin. It is also desired that the curve of the disturbed one $dV_1$ be fairly close to the curve of the undisturbed one $uV_1$ signal and, similarly, that the disturbed zero $dV_z$ curve be fairly close to the undisturbed zero $uV_z$ curve. That is, it is desired that the distance $f$ between the undisturbed one $uV_1$ and disturbed one $dV_1$ and the distance $g$ between the undisturbed zero $uV_z$ and disturbed zero $dV_z$ signal be at a minimum. Further, it is desired that the cross-over point for the disturbed one $dV_1$ and disturbed zero $dV_z$, that is, the point K where the disturb one $dV_1$ and disturb zero $dV_z$ touch the abscissa of the graph, be maximized as far to the right from the origin as feasible. As these conditions are obtained with the S-curve, large zero and one signals are obtained, a wide range of bit currents including bit currents of low amplitude are available for switching the intelligence in the memory element, lowering the uniformity requirements for the elemens in a large memory. Also, the intelligence in the memory element is not readily eliminated by accidentally applied stray fields or through the influence of adjacent fields. On the other hand, if these conditions are not met by the S-curve, that is, if the disturbed zero $dV_z$ and disturbed one $dV_1$ signals are small, if they are not of approximately the same signal magnitude, if the range of bit currents yielding large one and zero signals is narrow, or the cross-over point is not maximized to the right, the film yields a low signal on sensing and it requires very uniform memory elements with exactly the same range of usable bit currents. Further, the element has little resistance to the influence of stray fields.

For example, the difference signal between one and zero was between 30 and 50 millivolts over a range of bit currents of about 100 milliamperes, with the cross-over point at about 300 milliamperes. These parameters were determined from elements such as that shown in FIGURE 1 of about 0.02 inch outer diameter, 0.015 inch inner diameter, and with a thickness of about 0.0025 inch. The thickness of the resulting film was about 18,000 A. and the composition of the magnetic film contained 28% iron, 71.5% nickel, and 0.5% phosphorus.

EXAMPLE 2

Essentially the same procedure as that described in Example 1 was followed but the plating time was maintained at about 10 minutes. The film had a difference signal of about 10 millivolts with a cross-over point at about 400 milliamperes. The film contained about 32% iron, 67.5% nickel, and 0.5% phosphorus, and was deposited to a thickness of about 8000 A.

EXAMPLE 3

The same procedure as Example 1 was followed but the plating time was maintained at about 60 minutes. The film had a difference signal of about 5 millivolts with a cross-over point of about 150 milliamperes. The film contained 32% iron, 67.5% nickel, and 0.5% phosphorus, and was deposited to a thickness between 25,000 to 35,000 A.

EXAMPLE 4

The same procedure as Example 1 was followed but the solution contained 3.5 grams/liter sodium hypophosphite, the plating time was maintained at about 75 minutes. The resulting film exhibited a one to zero difference signal ratio of about 12 millivolts, had a cross-over point at about 240 milliamperes. The film contained about 26% to 28% iron, about 72% to 74% nickel, about 0.5% phosphorus, and was deposited to a thickness between 9,000 to 15,000 A.

EXAMPLE 5

The substrate was treated such as described in Example 1, but the electroless solution contained 5.4 grams/liter of sodium hypophosphite. The plating time was maintained at about 35 minutes. A one to zero difference signal ratio of about 16 millivolts was obtained with a cross-over point of about 350 milliamperes. The film contained about 31% iron, 69% nickel, 0.5% phosphorus, and was deposited to a thickness of about 15,000 A.

EXAMPLE 6

The same procedure as utilized in Example 1 was followed, but the electroless solution contained 11.8 grams/liter of sodium hypophosphite. The plating time was maintained at 25 minutes. A one to zero difference signal noise ratio of about 2 millivolts was obtained with a cross-over point at 120 milliamperes. The resulting film contained 26% iron, 73% nickel, and about 1.0% phosphorus, and was deposited to a thickness of about 20,000 A.

EXAMPLE 7

The same procedure as Example 1 was followed, but the concentration of the nickel ions was maintained at 0.33 gram/liter and the concentration of the ferrous ions at 0.11 gram/liter. The plating time was maintained at 80 minutes. The resulting characteristics were in conformity with that of the previous examples.

EXAMPLE 8

Essentially the same procedure was followed as for Example 1, but the nickel ion concentration was maintained at 22 grams/liter and the ferrous ions at 7.3 grams/liter. The plating time was maintained at about 30 minutes. The magnetic film on testing exhibited characteristics which were in agreement with those reported for the previous examples.

EXAMPLE 9

Essentially the same procedure as utilized in Example 1 was followed, but the concentration of ferrous ions was maintained at 2 grams/liter which corresponds to a nickel to ferrous ion ratio of about 1.66. The plating time was maintained at 40 minutes. The film on examination indicated a one to zero difference ratio of about 35 millivolts with a cross-over point of 200 milliamperes. The film contained about 25% iron, about 73% nickel, about 2% phosphorus, and was deposited to a thickness of about 18,000 A.

EXAMPLE 10

Essentially the same procedure as utilized in Example 1 was followed, but the ferrous ion concentration was maintained at 0.8 gram/liter, which corresponds to a nickel to ferrous ion ratio of about 4.16. The plating time was maintained at about 40 minutes. The one to zero difference signal of about 20 millivolts was obtained at a cross-over point of about 300 milliamperes. The film contained 29% iron, 71% nickel, 0.25% phosphorus, and was deposited to a thickness of about 12,000 A.

As brought out by the chart below, the preferred ingredients for utilization in the process may vary over a wide range.

| Plating Solution Compounds | Grams/liter | | |
|---|---|---|---|
| | Minimum | Optimum | Maximum |
| $NiSO_4 \cdot 6H_2O$ (nickel sulfate) | 1.2 | 13.3 | 120 |
| $(NH_4)_2SO_4 \cdot FeSO_4 \cdot 6H_2O$ (Ferrous ammonium sulfate) | 0.7 | 7.5 | 70 |
| $NaH_2PO_2 \cdot H_2O$ (sodium hypopphosphate) | 3.2 | 5.8 | 10 |
| $KNaC_4H_4O_6 \cdot 4H_2O$ (sodium potassium tartrate) | 10 | 30 | 150 |
| $NH_4OH$ (28–30% $NH_3$) (in milliliters/liter) (ammonium hydroxide) | 40 | 100 | 150 |

Figure 4:
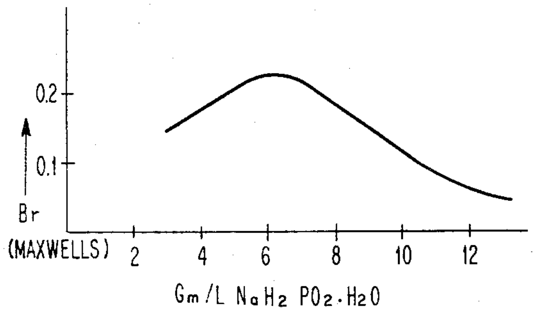
FIGURE 4 is a plot of magnetic remanence ($B_r$) in maxwells against hypophosphite sodium content according to the solution of this invention.
Figure 7:
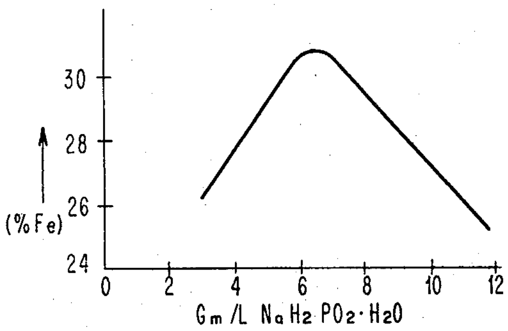
FIGURE 7 is a plot of percent weight iron against sodium hypophosphite content according to the invention.
Figure 5:
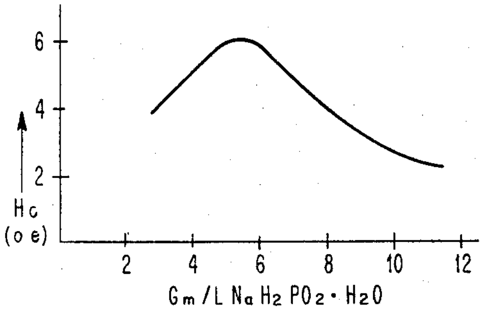
FIGURE 5 is a plot of coercivity ($H_c$) in oersteds against hypophosphite sodium contents in grams/liter according to the invention.
Figure 8:
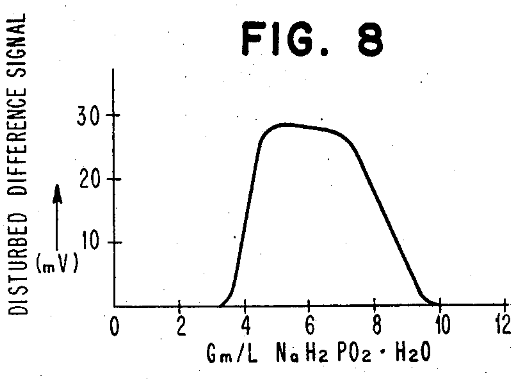
FIGURE 8 is a plot of the one to zero difference signal against hypophosphite sodium content according to the invention.
Figure 6:
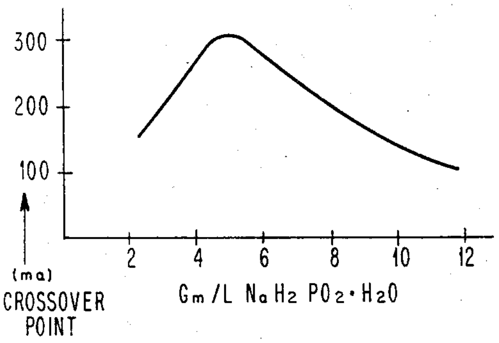
FIGURE 6 is a plot of the cross-over point in milliamperes against hypophosphite sodium content according to this invention.
Figure 9:
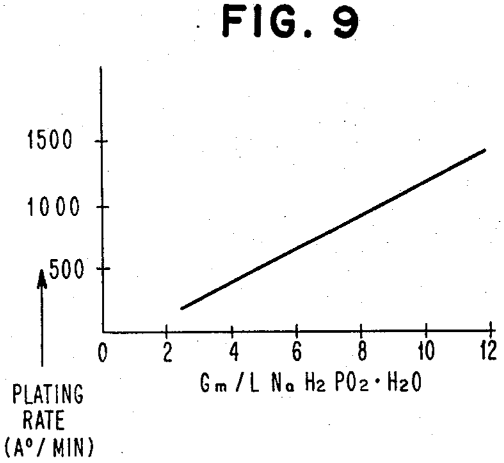
FIGURE 9 is a plot of plating rate in A. per minute against hypophosphite sodium content according to the invention.

Now with reference to FIGURES 4 through 9, it will be noted that various process parameters have been plotted against the sodium hypophosphite concentration. These figures further indicate that hypophosphite concentration is important in obtaining the required magnetic characteristics for a magnetic film for computer applications. From these plots it is seen that in solutions where the sodium hypophosphite concentration exceeds 10 grams/liter, or in terms of the hypophosphite ion, exceeds 7.0 grams/liter, the magnetic characteristics required for the storage of intelligence falls off. Now with particular reference to FIGURES 4, 5, and 6, it will be noted that several parameters are plotted against sodium hypophosphite concentration. In FIGURE 4, magnetic remanence $B_r$ in maxwells is plotted against the reducing agent; in FIGURE 5, coercivity $H_c$ in oersteds is plotted against it, and in FIGURE 6, the cross-over point is plotted against the sodium hypophosphite concentration. It will be noted that for each of these plots there is a rather small range of hypophosphite concentration which is available, if each of the parameters, for each of the plots, is to be at its most beneficial quantity for the magnetic film. Similarly, for FIGURES 7, 8, and 9, various parameters are again plotted against the sodium hypophosphite concentration where the abscissa is the same scale for all three plots. Here again note there is a small range of sodium hypophosphite concentration for which each of these parameters are at its most influential point for the magnetic film. In particular note the iron is at its most influential concentration when it ranges between 28 to 30 weight percent. Also, these plots indicate that plating rate decreases with decrease in hypophosphite content, which as previously stated is a most desirable condition for obtaining the required characteristics in the magnetic film. As brought out by Chart 1, it is not desirable to have a plating rate greater than 1500 A. per minute.

As previously mentioned, the nickel and ferrous ions may be furnished to the solution in the form of any water soluble salt, such as chlorides, sulfates, acetates, sulfanates and mixtures thereof as long as the anions do not interfere with the plating. Similarly, the hypophosphite ions may be furnished in the form of water soluble salts or various bases such as sodium hypophosphite, potassium hypophosphite, hypophosphorous acid and mixtures thereof.

Although it is preferred to use complexing and sequestering agents such as ammonia and sodium potassium tartrate, organic reagents which contain one or more of the following functional groups in concentrations that range from 5 grams/liter to 100 grams/liter and preferable at about 25 grams/liter: primary amino group ($—NH_2$), secondary amino group (>NH), tertiary amino group (>N—), imino group (=NH), carboxy group (—COOH), and hydroxy group (—OH). The preferred agents include Rochelle salt, Seignette salt, ammonia, ammonia hydroxide and ammonium chloride.

Similarly, various alkalizing agents may be added which include all the complexing agents heretofore listed, which in aqueous solution have a basic reaction and in addition all water soluble bases such as sodium, potassium, and lithium hydroxide, and the like.

Surface active substances may be added such as sodium lauryl sulfate, as long as the substances do not interfere with the plating reaction. Exaltants also may be added to increase the rate of deposition by activating the hypophosphite anions such as succinic acid, adipic anions, alkali fluorides and other exaltants may be employed which are known to those in the art. Stabilizers may be added in minute concentrations such as 10 parts per billion. These may be stabilizers such as thiourea, sodium ethylxanthate, lead sulfate and the like. Also, pH regulators and buffers such as boric acid, disodium phosphate and others may be included in the solution.

Other metal ions may be added to the electroless solution in their lowest oxidation states, such as cobalt ($Co^{++}$), molybdenum ($Mo^{++}$), chromium ($Cr^{++}$), and the like. These cations increase the coercive force of the films and thereby increase the stability against disturb fields.

What has been described is a low disturb and high signal ferromagnetic film suitable for computer and data processing applications of 15 to 35 percent by weight iron, 65 to 85 percent by weight nickel, and 0.25 to 2 percent by weight phosphorus. These films are formed with either isotropic or anisotropic properties depending on whether a field is applied during the formation process. The film is the product of a chemical reduction process where hypophosphite is used. It will be recognized that other reducing agents such as hydrazine and borohydride and the like are capable of reducing nickel and iron in an electroless solution but the magnetic characteristics of these films are not as suitable for the intended application.

For ferromagnetic films of the present invention with the composition 15 to 35 percent by weight iron, 65 to 85 percent by weight nickel and 0.25 to 2 percent by weight phosphorous, the magnetic remanence ($B_r$) varies from about 0.05 to about 0.35 maxwells, the coercivity varies from about 2 to about 6 oersteds and the switching speed, that is, the time it takes for the magnetization to reverse its direction by 180° under an applied field of 20 oersteds, is from about 2 to 6 nanoseconds. With these properties, storage and switching elements are furnished for use in data processing and computer machines which exhibit characteristics heretofore not available in the industry.

While desirable magnetic characteristics are exhibited for memory and switching elements by ferromagnetic films containing 15 to 35 percent by weight iron, 65 to 85 percent by weight nickel, and 0.25 to 2 percent by weight phosphorus, greater signal differences are available with ferromagnetic films containing 24 to 35 percent by weight iron, 65 to 76 percent by weight nickel, and 0.25 to 2 percent by weight phosphorus. The optimum characteristics for use in data processing and computer machines are obtained with a ferromagnetic film that contains 28 to 30 percent by weight iron, 70 to 72 percent by weight nickel, and 0.25 to 2 percent by weight phosphorus. These ferromagnetic films provide magnetic characteristics heretofore not available in the art.

While the invention has been particularly shown and described with reference to preferred embodiments thereof, it will be understood by those skilled in the art that various changes in form and details may be made therein without departing from the spirit and scope of the invention.

What is claimed is:

1. In the process for the production of nickel-iron-phosphorus alloys by electroless deposition from an aqueous solution of water soluble salts of nickel, ferrous iron and hypophosphorous acid, the improvement which comprises providing said nickel and ferrous salts in relative quantities which provide nickel and ferrous iron ions in a ratio in the range of 1 to 5, providing said salt of hypophosphorous acid in a quantity which supplies hypophosphite ions in an amount equivalent to about 3.2 to 10 grams of sodium hypophosphite per liter, and correlating the quantity of said hypophosphorous acid salt and the pH of said solution at a value in the range of 10 to 13 so that an alloy is deposited containing about 24 to 35% iron, about .25 to 2% phosphorus and the remainder essentially only nickel.

2. The process of claim 1 wherein an alloy is deposited containing about 28–30% iron.

3. The process of claim 1 wherein the pH of said solution is at a value of about 11.5.

4. The process of claim 1 wherein the hypophosphite ions are supplied in an amount of about 3.5 grams per liter.

5. The process of claim 4 wherein the pH of said solution is at a value of about 11.5.

6. In the production of nickel-iron-phosphorus alloys by electroless deposition from an aqueous solution of water soluble salts of nickel, ferrous iron and hypophosphorous acid, the improvement which comprises providing said nickel and ferrous salts in relative quantities which provide nickel and ferrous iron ions in a ratio in the range of 1 to 5, providing said salt of hypophosphorous acid in a quantity which supplies hypophosphite ions in an amount equivalent to about 5.8 grams of sodium hypophosphite per liter, and providing a pH in said solution at a value of about 11.5 thereby depositing an alloy containing about 28 to 30% iron, about .25 to 2% phosphorus and the remainder essentially only nickel.

References Cited

UNITED STATES PATENTS

| | | | |
|---|---|---|---|
| 2,827,399 | 3/1958 | Eisenberg | 117—130 |
| 3,178,311 | 4/1965 | Cann | 117—130 X |
| 3,268,353 | 8/1966 | Melillo | 117—130 X |
| 3,282,723 | 11/1966 | Melillo | 117—130 X |

ALFRED L. LEAVITT, *Primary Examiner.*

J. R. BATTEN, JR., *Assistant Examiner.*

UNITED STATES PATENT OFFICE
CERTIFICATE OF CORRECTION

Patent No. 3,385,725 May 28, 1968

Arnold F. Schmeckenbecher

It is certified that error appears in the above identified patent and that said Letters Patent are hereby corrected as shown below:

Column 1, line 64, "surface" should read -- surfaces --. Column 5, line 69, after "chloride" insert a parenthesis. Column 6, line 11, before "pH" insert -- The --; line 18, after "anisotropic" insert -- and isotropic --; line 59, "20" should read -- 30 --. Column 8, line 37, after "difference" insert -- signal --; line 64, "hypopphosphate" should read -- hypophosphite --. Column 9, lines 46 and 47, "preferable" should read -- preferably --.

Signed and sealed this 11th day of November 1969.

SEAL)

ttest:

dward M. Fletcher, Jr.
ttesting Officer

WILLIAM E. SCHUYLER, JR.
Commissioner of Patents